No. 783,915.                                    Patented February 28, 1905.

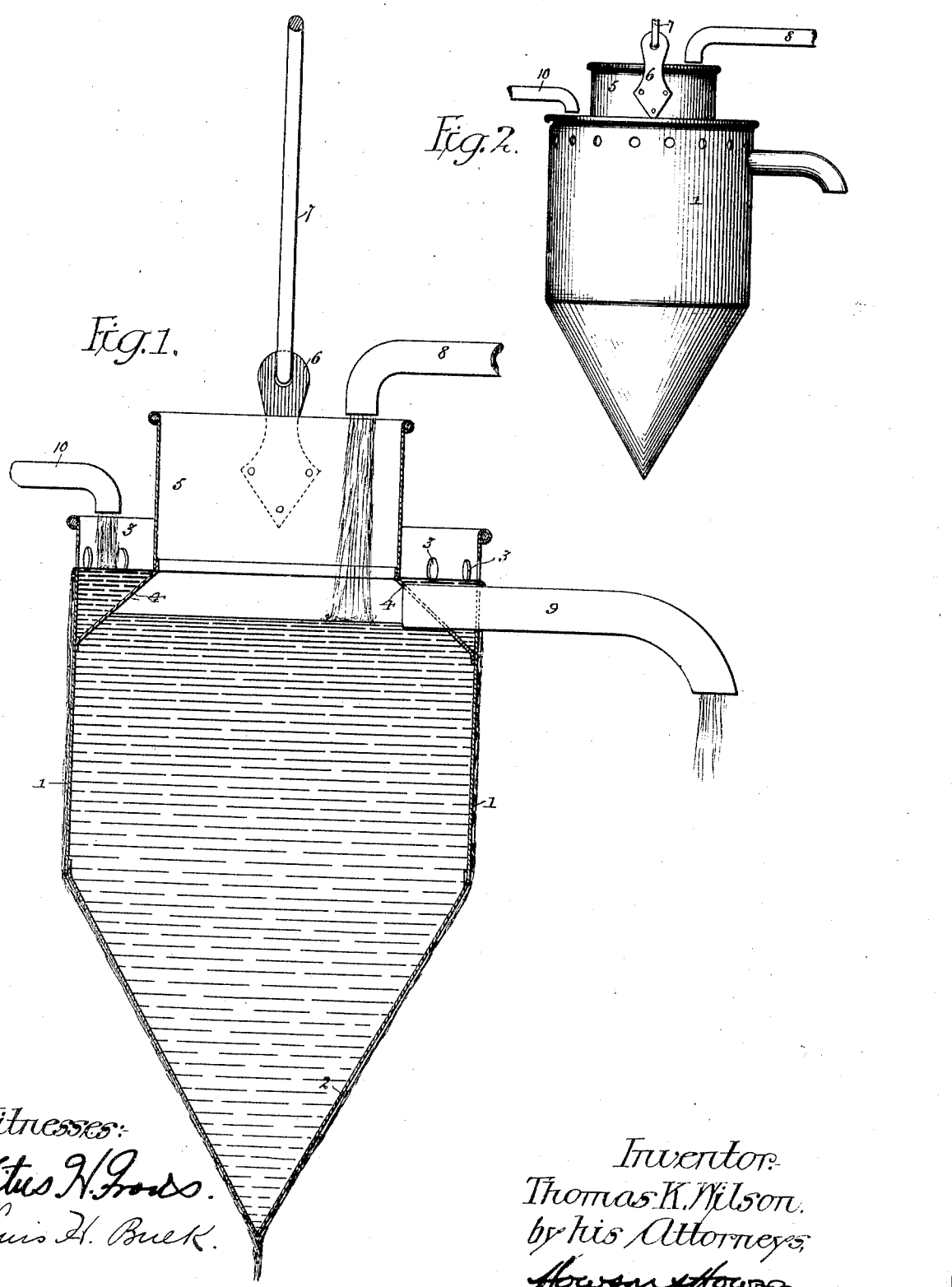

UNITED STATES PATENT OFFICE.

THOMAS K. WILSON, OF ATLANTIC CITY, NEW JERSEY.

APPARATUS FOR COOLING AND AERATING LIQUIDS.

SPECIFICATION forming part of Letters Patent No. 783,915, dated February 28, 1905.

Application filed September 8, 1904. Serial No. 223,729.

*To all whom it may concern:*

Be it known that I, THOMAS K. WILSON, a citizen of the United States, and a resident of Atlantic City, New Jersey, have invented certain Improvements in Apparatus for Cooling and Aerating Liquids, of which the following is a specification.

The object of my invention is to provide a simple and efficient form of cooler and aerator for milk and other liquids, an object which I attain in the manner hereinafter set forth, reference being had to the accompanying drawings, in which—

Figure 1 is a vertical section of a cooling and aerating device constructed in accordance with my invention, and Fig. 2 is a side elevation of the same on a smaller scale.

1 represents a vessel, preferably of cylindrical shape and having a conical bottom 2, said vessel having some distance below the top a series of perforations 3.

Secured to the interior of the vessel 1 some distance below the perforations 3 is a ring 4, preferably of frusto-conical form, as shown in Fig. 1, this ring terminating at the upper end in a neck 5, having ears 6 for the reception of a suspension-bail 7 or other suitable means of support. Water or other cooling fluid is supplied to the vessel 1 from a pipe 8, and the rise of the water in said vessel 1 is restricted by an overflow-pipe 9.

The milk or other liquid to be cooled and aerated is supplied by a pipe 10 to the annular space between the upper portion of the vessel 1 and the internal ring 4, and when said space has been filled the milk or other liquid overflows through the perforations 3 and flows down the cylindrical sides of the vessel 1 and down the conical bottom of the same, finally escaping in a stream from the apex of the cone, as shown in Fig. 1. By this means every part of the external surface of the vessel 1, which is cooled by the water or other liquid contained in said vessel, is covered by the milk or other liquid in its flow and the full cooling effect of the liquid contained in the vessel 1 is thereby insured, the milk or other fluid after being cooled and aerated by reason of its flow escaping in a stream from the point of the inverted conical bottom of the vessel, so that it can be directed at once into a suitable receptacle without the necessity of employing a special collecting and conveying device.

While I prefer to use a cylindrical vessel with conical bottom, it will be evident that a vessel of square or other polygonal cross-section having a tapering bottom of corresponding cross-section could be employed without departing from the essential features of my invention. Ice may be placed in the water or other cooling liquid in the vessel 1 when it is desired to reduce the temperature of the same below its normal temperature.

Having thus described my invention, I claim and desire to secure by Letters Patent—

1. A cooling and aerating device, comprising a vessel having a tapering bottom and adapted for the reception of the cooling fluid, said vessel having at the top a chamber for the reception of the liquid to be cooled, whereby the liquid escaping from said chamber flows down the sides and tapering bottom of the vessel and discharges in a single stream from the apex of the latter, substantially as specified.

2. The combination in a liquid cooler and aerator, of a vessel having a tapering bottom and adapted for the reception of the cooling fluid, a ring secured to the inner side of said vessel some distance below the top of the same, said ring terminating in a central neck, and a suspension device connected to said neck, said ring forming, in connection with the upper portion of the vessel, a chamber for the reception of the liquid to be cooled, substantially as specified.

3. A cooling and aerating device for liquids, consisting of a vessel for the reception of the cooling fluid, said vessel having a tapering bottom, an internal ring some distance below the top, a central neck whereby the vessel is suspended, and an overflow-pipe for the chamber within said vessel, substantially as specified.

In testimony whereof I have signed my name to this specification in the presence of two subscribing witnesses.

THOMAS K. WILSON.

Witnesses:
 EUGENE G. SCHWINGHAMMER,
 GEORGE WM. STONE.